US009503385B2

United States Patent
Xie et al.

(10) Patent No.: US 9,503,385 B2
(45) Date of Patent: Nov. 22, 2016

(54) DELAY REQUEST PROCESSING METHOD AND APPARATUS BASED ON TOKEN BUCKET

(71) Applicant: Huawei Technologies Co., Ltd., Shenzhen, Guangdong (CN)

(72) Inventors: Fei Xie, Chengdu (CN); Guoming Shen, Shenzhen (CN); Qingchang Zhong, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 14/482,875

(22) Filed: Sep. 10, 2014

(65) Prior Publication Data
US 2015/0172199 A1   Jun. 18, 2015

(30) Foreign Application Priority Data

Nov. 19, 2013   (CN) .......................... 2013 1 0581113

(51) Int. Cl.
*H04L 12/875* (2013.01)
*H04L 12/819* (2013.01)
*H04L 12/851* (2013.01)

(52) U.S. Cl.
CPC ............. *H04L 47/56* (2013.01); *H04L 47/215* (2013.01); *H04L 47/245* (2013.01)

(58) Field of Classification Search
CPC ...................................... H04L 47/10–47/2483
See application file for complete search history.

(56) References Cited

U.S. PATENT DOCUMENTS

| | | | | |
|---|---|---|---|---|
| 6,820,263 | B1* | 11/2004 | Klappholz | G06F 9/52 718/102 |
| 7,627,721 | B2* | 12/2009 | Hass | H04L 49/00 709/251 |
| 2007/0223375 | A1 | 9/2007 | Ohta et al. | |
| 2009/0213734 | A1* | 8/2009 | Hashinaga | H04L 47/10 370/235 |
| 2010/0085874 | A1 | 4/2010 | Noy et al. | |

FOREIGN PATENT DOCUMENTS

| | | |
|---|---|---|
| CN | 101060471 A | 10/2007 |
| CN | 101848167 A | 9/2010 |
| CN | 102035732 A | 4/2011 |
| CN | 102377641 A | 3/2012 |
| EP | 2 466 824 A1 | 6/2012 |

OTHER PUBLICATIONS

Zhu Lin, et al., "Multiple Token Bucket P2P Worms Throttle Method", Journal of Wuhan University of Technology, vol. 33, No. 3, Jun. 2009, 4 pages.

* cited by examiner

*Primary Examiner* — Nicholas Taylor
*Assistant Examiner* — Clayton R Williams

(57) ABSTRACT

The present invention discloses a delay request processing method and apparatus that are based on a token bucket and relates to the field of communications technologies, where the method and the apparatus are invented to shorten a scanning period when a delay request is processed. The method includes: receiving a delay request message of a queue corresponding to a token bucket, where the delay request message includes delay request time; determining, according to the delay request time, whether the delay request message needs to be processed preferentially; processing the delay request message in a preferentially processing manner when it is determined that the delay request message needs to be processed preferentially. The present invention may be applied to a delay request processing technology.

8 Claims, 7 Drawing Sheets

DELAY REQUEST PROCESSING METHOD AND APPARATUS BASED ON TOKEN BUCKET

CROSS-REFERENCE TO RELATED APPLICATIONS

This application claims priority to Chinese Patent Application No. 201310581113.0, filed on Nov. 19, 2013, which is hereby incorporated by reference in its entirety.

TECHNICAL FIELD

The present invention relates to the field of communications technologies, and in particular, to a delay request processing method and apparatus that are based on a token bucket.

BACKGROUND

In a process of using a token bucket to control traffic of a data network, when a token in the token bucket is used up, it indicates that no traffic in the data network can be allocated to a queue corresponding to the token bucket; therefore, the queue corresponding to the token bucket needs to exit scheduling temporarily. At this moment, the token bucket needs to be disabled, and a scheduling request sent by the queue corresponding to the disabled token bucket needs to be used as a delay request for processing. When delay request time of a queue arrives, that is, when enough tokens are accumulated in the disabled token bucket, the disabled token bucket is enabled again, and the queue corresponding to this token bucket participates in the scheduling again.

In the prior art, when delay requests of queues corresponding to token buckets are processed, all delay request information of queues that send delay requests is stored in one memory, then a queue of which delay request time has arrived is obtained by scanning the memory, and the queue of which the delay request time has arrived is processed.

In a practical application, there are always a large number of queues that send delay requests; therefore, a scanning period is long when delay requests of queues are processed in a processing manner in the prior art.

SUMMARY

In view of this, the present invention provides a delay request processing method and apparatus that are based on a token bucket, so as to shorten a scanning period.

To achieve the foregoing objective, the following technical solutions are used in embodiments of the present invention.

According to a first aspect, the present invention provides a delay request processing method based on a token bucket, including: receiving a delay request message of a queue corresponding to a token bucket, where the delay request message includes delay request time;

determining, according to the delay request time, whether the delay request message needs to be processed preferentially; and processing the delay request message in a preferentially processing manner when it is determined that the delay request message needs to be processed preferentially.

In a first implementation manner of the first aspect, the processing the delay request message in a preferentially processing manner includes:

saving the delay request message; and scanning the delay request message in a round robin manner, and when the delay request time arrives, sending the delay request message to a downlink module for processing.

With reference to the first implementation manner of the first aspect, in a second implementation manner of the first aspect, before the saving the delay request message, the method further includes: determining whether an identifier of the queue that sends the delay request message is stored;

the saving the delay request message specifically includes:

when the identifier of the queue has been stored, updating, by using the delay request time, stored delay request time corresponding to the identifier of the queue, and marking the identifier of the queue as a to-be-processed state; and when the identifier of the queue has not been stored, storing the identifier of the queue, and marking the identifier of the queue as the to-be-processed state; and the scanning the delay request message in a round robin manner, and when the delay request time arrives, sending the delay request message to a downlink module for processing specifically includes:

scanning the delay request message in the round robin manner, and acquiring the delay request time of the queue that is in the to-be-processed state;

acquiring corresponding global time at which the delay request message is received;

acquiring current global time;

when a difference between the current global time and the corresponding global time at which the delay request message is received is greater than or equal to the delay request time, sending the delay request message to the downlink module for processing, and marking the identifier of the queue as a processed state; and when the difference between the current global time and the corresponding global time at which the delay request message is received is less than the delay request time, keeping the identifier of the queue in the to-be-processed state.

With reference to the second implementation manner of the first aspect, in a third implementation manner of the first aspect, where the storing the identifier of the queue specifically includes:

storing the identifier of the queue in a cache.

With reference to the third implementation manner of the first aspect, in a fourth implementation manner of the first aspect, before the storing the identifier of the queue in a cache, the method further includes:

determining whether the cache can store the identifier of the queue; and the storing the identifier of the queue in a cache specifically includes: storing the identifier of the queue in the cache when it is determined that the cache can store the identifier of the queue.

With reference to the first aspect and the first to the fourth implementation manners of the first aspect, in a fifth implementation manner of the first aspect, the determining, according to the delay request time, whether the delay request message needs to be processed preferentially includes:

comparing the delay request time of the queue with preset delay time; and if the delay request time of the queue is less than or equal to the preset delay time, determining that the delay request message needs to be processed preferentially; otherwise, determining that the delay request message does not need to be processed preferentially.

According to a second aspect, the present invention provides a delay request processing apparatus based on a token bucket, including:

a receiving unit, configured to receive a delay request message of a queue corresponding to a token bucket, where the delay request message includes delay request time;

a determining unit, configured to determine, according to the delay request time received by the receiving unit, whether the delay request message needs to be processed preferentially; and a processing unit, configured to process the delay request message in a preferentially processing manner when the determining unit determines that the delay request message needs to be processed preferentially.

In a second implementation manner of the second aspect, the processing unit includes:

a saving subunit, configured to save the delay request message when the determining unit determines that the delay request message needs to be processed preferentially; and a scanning subunit, configured to: scan, in the round robin manner, the delay request message saved by the saving subunit, and when the delay request time arrives, send the delay request message to a downlink module for processing.

With reference to the first implementation manner of the second aspect, in a second implementation manner of the second aspect, the saving subunit is specifically configured to:

when an identifier of the queue has been stored, update, by using the delay request time, stored delay request time corresponding to the identifier of the queue, and mark the identifier of the queue as a to-be-processed state; and when the identifier of the queue has not been stored, store the identifier of the queue, and mark the identifier of the queue as the to-be-processed state; and the scanning subunit is specifically configured to:

scan the delay request message in the round robin manner, and acquire the delay request time of the queue that is in the to-be-processed state, where the delay request time of the queue is saved by the saving subunit;

acquire corresponding global time at which the receiving unit receives the delay request message;

acquire current global time;

when a difference between the current global time and the corresponding global time at which the receiving unit receives the delay request message is greater than or equal to the delay request time, send the delay request message to the downlink module for processing, and mark the identifier of the queue as a processed state; and when the difference between the current global time and the corresponding global time at which the receiving unit receives the delay request message is less than the delay request time, keep the identifier of the queue in the to-be-processed state.

With reference to the second implementation manner of the second aspect, in a third implementation manner of the second aspect, when storing the identifier of the queue, the saving subunit is specifically configured to:

store the identifier of the queue in a cache.

With reference to the third implementation manner of the second aspect, in a fourth implementation manner of the second aspect, the determining unit is configured to:

determine whether the cache can store the identifier of the queue; and the saving subunit is specifically configured to store the identifier of the queue in the cache when the determining unit determines that the cache can store the identifier of the queue.

With reference to the second aspect and the first to the fourth implementation manners of the second aspect, in a fifth implementation manner of the second aspect, the determining unit is specifically configured to:

compare the delay request time with preset delay time, and when the delay request time is less than or equal to the preset delay time, determine that the delay request message needs to be processed preferentially; otherwise, determine that the delay request message does not need to be processed preferentially.

According to the delay request processing method and apparatus that are based on a token bucket provided in the embodiments of the present invention, when a delay request message of a queue is processed, it is first determined, according to delay request time of the queue, whether the delay request message of the queue needs to be processed preferentially, and when preferential processing is required, the delay request message of the queue is processed preferentially. Delay request messages of a part of queues are processed preferentially, so as to increase a speed of processing the delay request messages of the part of queues, thereby increasing a speed of processing delay request messages of all queues involved in delay requesting. By using the delay request processing method and apparatus in the embodiments of the present invention, a drawback of a low speed at which all queues involved in delay requesting are simultaneously processed in the prior art is overcome, and a scanning period is shortened.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
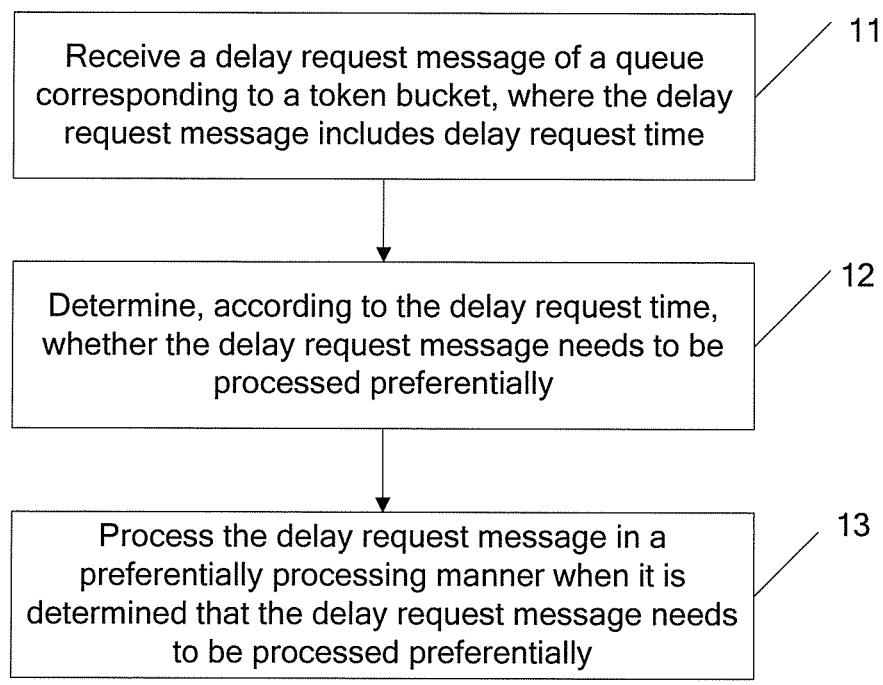
FIG. 1 is a flowchart of a delay request processing method based on a token bucket according to a first embodiment of the present invention.

To overcome a defect that in the prior art, a period of processing a delay request of a queue corresponding to each token bucket is long, a first embodiment of the present invention provides a delay request processing method based on a token bucket. As shown in FIG. 1, the delay request processing method based on a token bucket in the first embodiment of the present invention includes:

Step 11: Receive a delay request message of a queue corresponding to a token bucket, where the delay request message includes delay request time.

The delay request time herein is a time value, which is used to indicate time, for example, 100 ms, that the queue allows to delay processing of the delay request message of the queue.

Step 12: Determine, according to the delay request time, whether the delay request message needs to be processed preferentially.

In a specific application, this step includes: comparing the delay request time with preset delay time, and if the delay request time of the queue is less than or equal to the preset delay time, determining that the delay request message needs to be processed preferentially; otherwise, determining that the delay request message does not need to be processed preferentially.

The preset delay time is a time value, which may be preset by a user or may be set by a system. For example, the preset delay request time may be set to 50 ms. In a practical application, setting of the preset delay time depends on a specific situation, and is not limited in the present invention.

In addition, the delay request message of the queue further includes an identifier of the queue. The identifier of the queue is used to uniquely identify the queue, for example, an identifier of a queue may be "Entry_ID". A form of an identifier of a queue is not limited herein, as long as the identifier of the queue can uniquely identify the queue.

For example, it is assumed that delay request time of a queue "a" (referring to an identifier) is 40 ms, and preset delay time is set to 50 ms. The delay request time (40 ms) of the queue "a" is compared with the preset delay time (50 ms), and a result is that the delay request time of the queue "a" is less than the preset delay time; therefore, it can be determined that a delay request message of the queue "a" needs to be processed preferentially.

Step 13: Process the delay request message in a preferentially processing manner when it is determined that the delay request message needs to be processed preferentially.

The preferentially processing manner is a faster processing manner different from that in the prior art. For example, the preferentially processing manner may be: processing, by using a cache technology, a delay request message that needs to be processed preferentially, so as to increase a speed of processing the delay request message.

It can be seen from the foregoing that, by using the delay request processing method based on a token bucket in this embodiment of the present invention, delay request messages of a part of queues are processed preferentially, so as to increase a speed of processing the delay request messages of the part of queues, thereby increasing a speed of processing delay request messages of all queues involved in delay requesting; as a result, a drawback of a low speed at which all queues involved in delay requesting are simultaneously processed in the prior art is overcome and a scanning period is shortened.

A delay request processing method based on a token bucket in a second embodiment of the present invention is described in detail in the following.

Figure 2A:
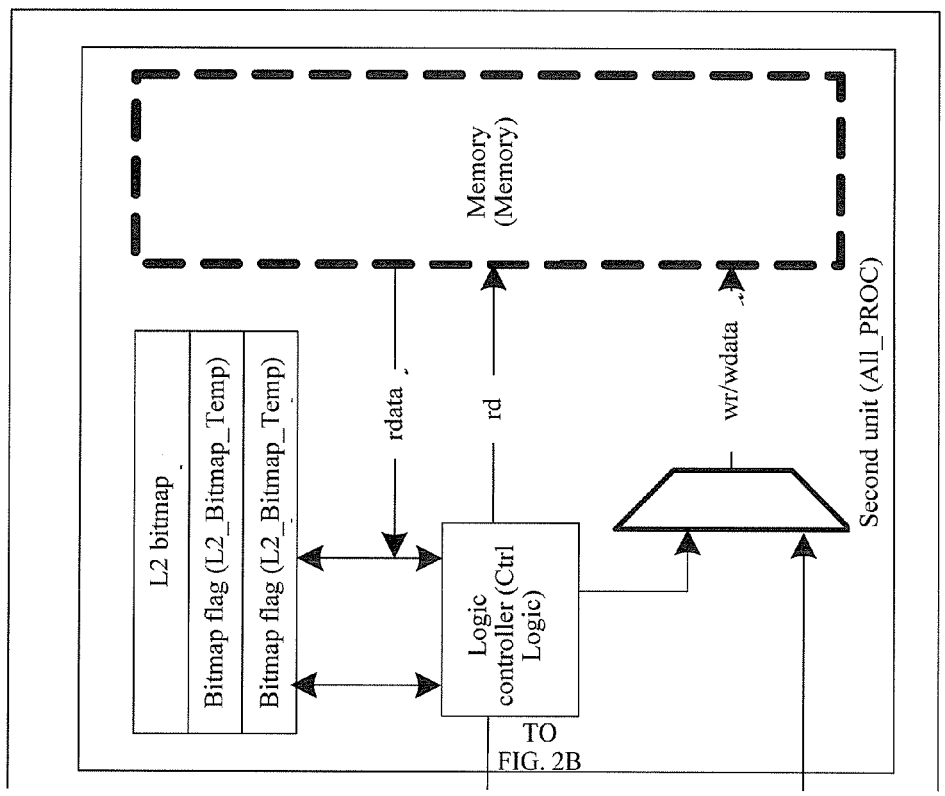
FIG. 2A is the first part of a schematic structural diagram of a circuit of a delay request processing method based on a token bucket according to a second embodiment of the present invention.
Figure 2B:
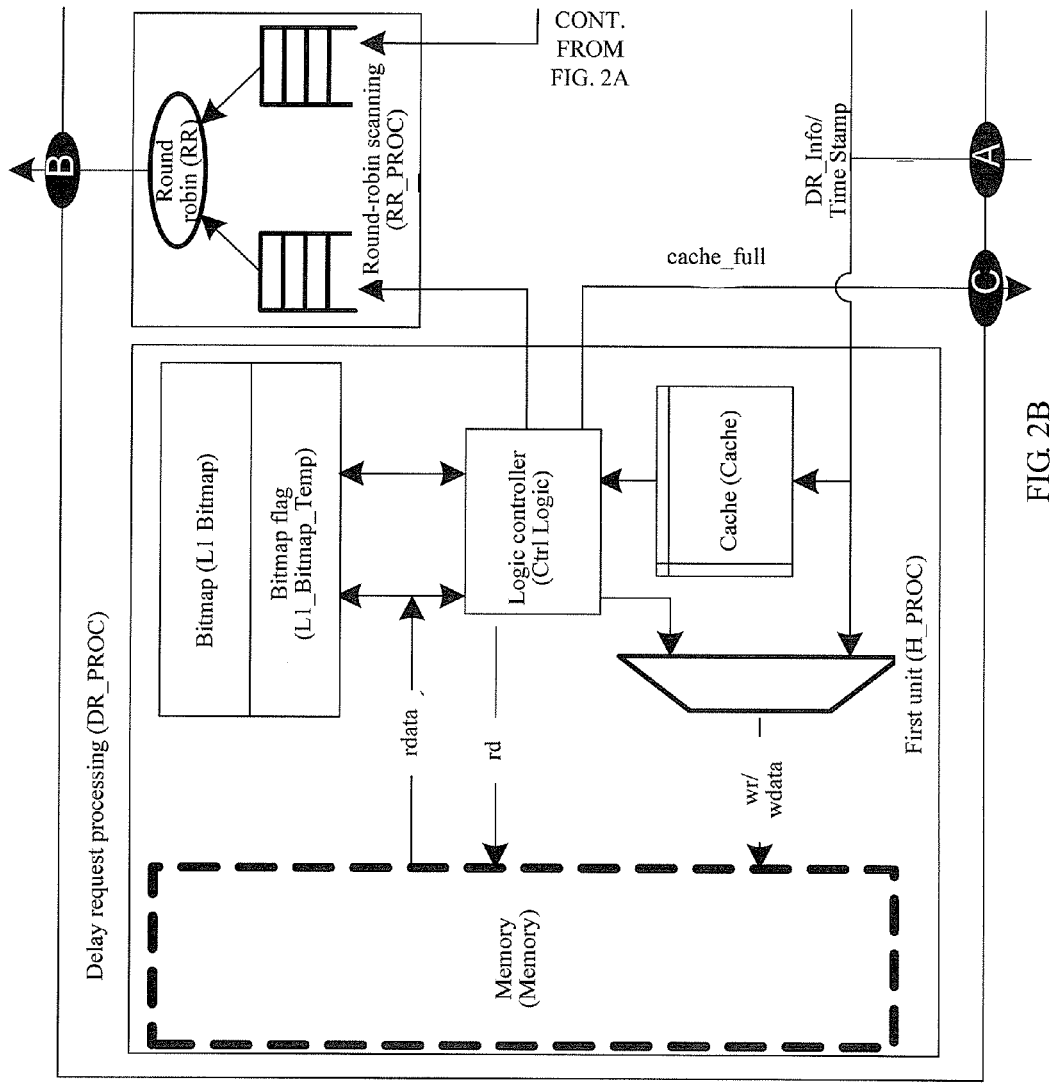
FIG. 2B is the second part of the schematic structural diagram of the circuit of the delay request processing method based on the token bucket according to the second embodiment of the present invention.

A delay request processing apparatus shown in FIG. 2A and FIG. 2B may be divided into two parts. In the delay request processing apparatus, a first unit H_PROC is configured to use a method provided in the present invention to preferentially process a delay request message (DR_Info) of a queue that needs to be processed preferentially, and a second unit ALL_PROC is configured to use a delay request processing method in the prior art to process a delay request message that does not need to be processed preferentially, and in some cases, for example, in a case in which a cache (Cache) of the first unit is full, the second unit ALL_PROC is also configured to process a delay request message that needs to be processed preferentially.

As shown in FIG. 2A and FIG. 2B, the apparatus has three external interfaces, which are an interface A, an interface B, and an interface C. The interface A is an interface that receives a delay request message, of a queue, sent by an uplink module, and receives global time (TimeStamp); the interface B is an interface that is configured to output information about a queue of which delay request time arrives; and the interface C is an interface that provides, in the case in which the cache (Cache) of the first unit is full, the interface A with a back-pressure signal (cache_full) indicating that the cache (Cache) is full.

As shown in FIG. 2A and FIG. 2B, the first unit H_PROC includes: the cache (Cache), a bitmap (L1 Bitmap), a memory (Memory), and a logic controller; and the second unit ALL_PROC includes: a bitmap, a memory (Memory), and a logic controller. For the first unit, a processing mechanism of "bitmap+cache" is used to process a delay request of a queue, where an identifier of the queue is stored in the cache (Cache), and delay request time of the queue is stored in the memory (Memory). For the second unit, a processing mechanism of "bitmap" is used to process a delay request of a queue, where an identifier and delay request time of the queue are stored in the memory (Memory). The processing mechanism of the second unit is the same as that in the prior art, and details are not described herein again. The processing mechanism of the first unit is described in detail in the following.

Figure 3:
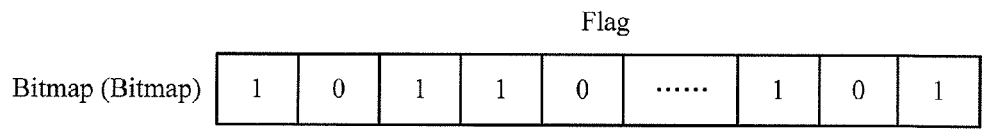
FIG. 3 is a schematic diagram of a bitmap flag according to the second embodiment of the present invention.

As shown in FIG. 3, a bitmap may include a plurality of flags according to setting, where each flag is corresponding to an identifier of a queue, and is used to indicate a processing status (including a to-be-processed state and a processed state) of a delay request message of the queue, that is, to indicate whether the identifier of the queue is processed in the cache. For example, a flag corresponding to a queue may be preset to 1, which is corresponding to that a delay request message of the queue is in the to-be-processed state, that is, an identifier of the queue corresponding to the flag is processed in the cache; and a flag corresponding to a queue is 0, which is corresponding to that a delay request message of the queue is in a processed state, that is, an identifier of the queue corresponding to the flag is not processed in the cache. Certainly, bitmap flags may also be distinguished by using an identifier in another form, as long as a processing status of a delay request message of a queue can be indicated.

For ease of description, that a flag is 1, which is corresponding to that a delay request message of a queue is in the to-be-processed state and a flag is 0, which is corresponding to that a delay request message of a queue is in a processed state is used as an example for description in the following.

A bit width of a bitmap flag herein is the same as a depth of the cache (Cache). The depth of the cache (Cache) may be calculated by using the following formula:

Cache depth=line-rate bandwidth/minimum rate

The line-rate bandwidth refers to the amount of network traffic, for example, 100 G, and the minimum rate refers to a rate limit value of a token bucket, for example, 32 Kbps.

For example, as shown in Table 1, an application in a traffic management chip whose line-rate bandwidth is 100 G is used as an example, and a range of the rate limit value of the token bucket is 32 Kbps-100 Gbps.

TABLE 1

| Rate Level | Bandwidth |
| --- | --- |
| K0 | 40.0G-100.0G |
| K1 | 20.0G-40.0G |
| K2 | 10.0G-20.0G |
| K3 | 32.0K-10.0G |

A rate value of the token bucket is classified into four levels according to different rates. As shown in Table 1, a 40.0 G-100.0 G bandwidth is corresponding to a K0 level, a 20.0 G-40.0 G bandwidth is corresponding to a K1 level, a 10.0 G-20.0 G bandwidth is corresponding to a K2 level, and a 32.0K-10.0 G bandwidth is corresponding to a K3 level. In a practical application, according to a specific situation, the K0, K1, and K2 levels may be defined as high-rate levels, and the K3 level may be defined as a low-rate level. According to the foregoing formula, in a normal application, the largest number of queues corresponding to high-rate levels is 3 (100/40≈3), 5 (100/20=5), and 10 (100/10=10). Therefore, a Cache depth of the first unit that processes the three levels K0, K1, and K2 is set to 10 (the largest number of queues among K0, K1, and K2 is selected). A queue of the low-rate level may be processed in the second unit ALL_PROC.

It is assumed that three queues send delay requests, and identifiers of the three queues are "a", "b", and "c"; and the three queues may be called a queue "a", a queue "b", and a queue "c", and delay request time corresponding to the three queues are 100 ms, 600 ms, and 700 ms. In addition, it is assumed that preset delay time is 200 ms.

Figure 4:
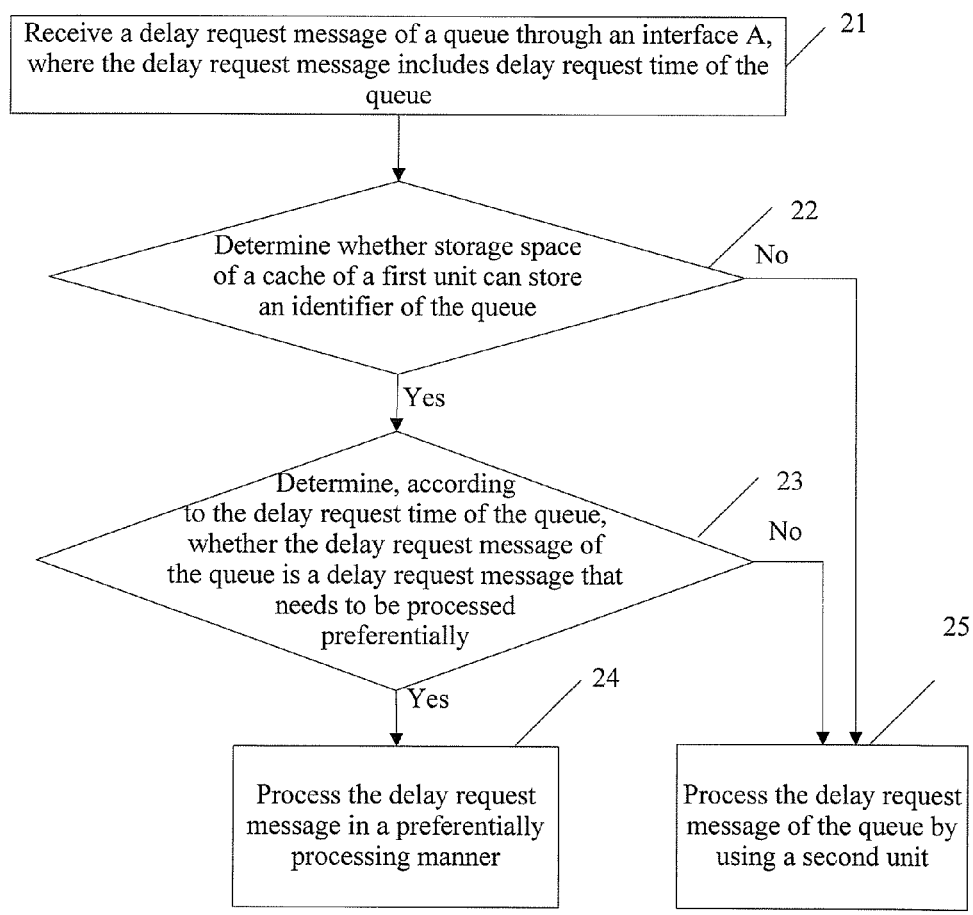
FIG. 4 is a flowchart of a delay request processing method based on a token bucket according to the second embodiment of the present invention.

The method in the second embodiment of the present invention is described in detail in the following with reference to FIG. 2A, FIG. 2B and FIG. 4. As shown in FIG. 4, the delay request processing method based on a token bucket in the second embodiment of the present invention includes:

Step 21: Receive a delay request message of a queue through an interface A, where the delay request message includes delay request time of the queue. In addition, the delay request message further includes an identifier of the queue.

In this embodiment, this step specifically is: receiving delay request messages of a queue "a", a queue "b", and a queue "c" through the interface A. The delay request message of the queue "a" includes an identifier "a" of the queue "a" and delay request time 100 ms of the queue "a", the delay request message of the queue "b" includes an identifier "b" of the queue "b" and delay request time 600 ms of the queue "b", and the delay request message of the queue "c" includes an identifier "c" of the queue "c" and delay request time 700 ms of the queue "c".

Step 22: Determine whether storage space of a cache of a first unit can store an identifier of the queue. If yes, perform step 23; if no, perform step 25.

Due to a limitation of a storage capacity of the cache, only when the cache is not full (that is, when not all bitmap flags are 1), the delay request message of the queue can be sent to the cache and a memory for processing. Otherwise, when the storage space of the cache is full (that is, when all the bitmap flags are 1), an interface C provides the interface A with a back-pressure signal indicating that the cache is full, and the delay request message of the queue is sent to a second unit for processing.

For example, as shown in FIG. 2A and FIG. 2B, it is determined, according to whether all the bitmap flags are 1, whether the cache is full. If not all bitmap flags are 1, it indicates that the cache is not full, and in addition, if a delay request message of a queue is a delay request message that needs to be processed preferentially (step 23), the delay request message of the queue may be sent to the cache and the memory for processing (to be processed in the first unit). If all bitmap flags corresponding to queue identifiers stored in the cache are 1, the interface C generates a back-pressure signal indicating that the cache is full, and provides the interface A with the back-pressure signal; and afterward, all delay request messages of subsequent queues are sent to the second unit for processing.

Step 23: Determine, according to the delay request time of the queue, whether the delay request message of the queue is a delay request message that needs to be processed preferentially. If yes, perform step 24; if no, perform step 25.

In a specific application, this step includes: comparing the delay request time of the queue with preset delay time; and if the delay request time of the queue is less than or equal to the preset delay time, determining that the delay request message needs to be processed preferentially; otherwise, determining that the delay request message does not need to be processed preferentially.

For example, delay request time (which is 100 ms, 600 ms, and 700 ms) of the queue "a", the queue "b", and the queue "c" is compared with the preset delay time (200 ms). The delay request time of the queue "a" is less than the preset delay time; therefore, it is determined that the delay request message of the queue "a" needs to be processed preferentially. The delay request time of the queue "b" and the delay request time of the queue "c" are both greater than the preset delay time; therefore, it is determined that the delay request message of the queue "b" and the delay request message of the queue "c" do not need to be processed preferentially. A queue that needs to be processed preferentially may be called a high-rate queue, and a queue that does not need to be processed preferentially may be called a low-rate queue. Therefore, herein, the queue "a" may be called a high-rate queue, and the queue "b" and the queue "c" may be called low-rate queues.

In addition, in a specific application, this step may also be performed before step 22.

Step 24: Process the delay request message in a preferentially processing manner.

Figure 5:
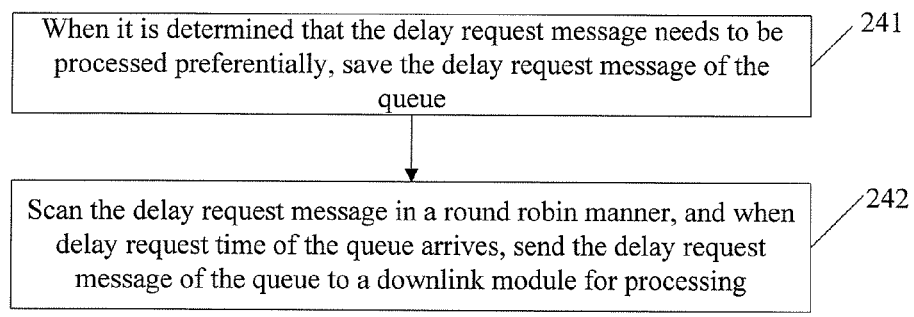
FIG. 5 is a flowchart of specific steps in step 24 according to the second embodiment of the present invention.

As shown in FIG. 5, in a specific application, this step includes:

Step 241: When it is determined that the delay request message needs to be processed preferentially, save the delay request message.

Step 242: Scan the delay request message in a round robin manner, and when the delay request time of the queue arrives, send the delay request message of the queue to a downlink module for processing.

Figure 6:
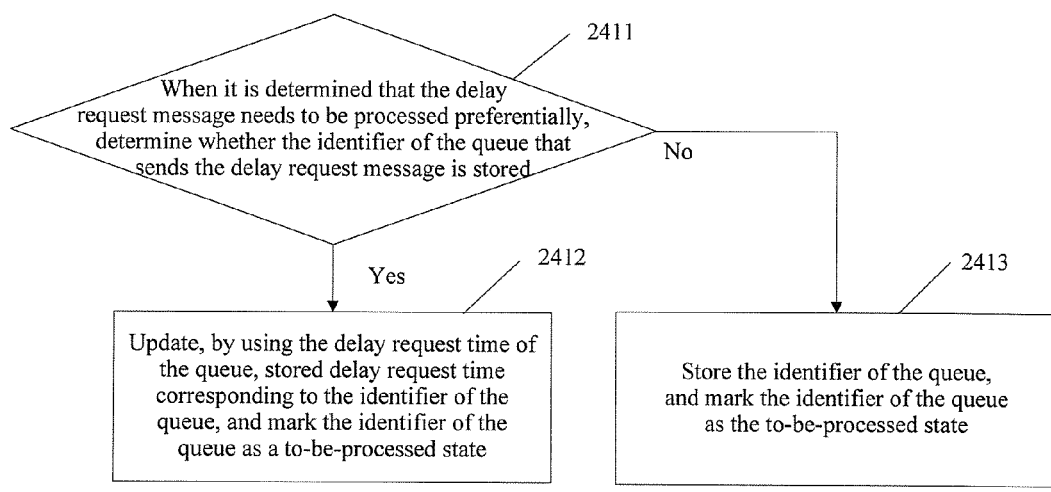
FIG. 6 is a flowchart of saving work according to the second embodiment of the present invention.

As shown in FIG. 6, step 241 includes:

Step 2411: When it is determined that the delay request message needs to be processed preferentially, determine whether the identifier of the queue that sends the delay request message is stored. If the identifier of the queue has been stored, perform step 2412; and if the identifier of the queue has not been stored, perform step 2413.

Step 2412: When the identifier of the queue has been stored, update, by using the delay request time of the queue, stored delay request time corresponding to the identifier of the queue, and mark the identifier of the queue as a to-be-processed state. In a specific application, a bitmap flag corresponding to the identifier of the queue may be marked as 1.

Step 2413: When the identifier of the queue has not been stored, store the identifier of the queue, and mark the identifier of the queue as the to-be-processed state. In a specific application, a storage address may be assigned to the queue in the cache, so as to save the identifier of the queue, and a bitmap flag corresponding to the identifier of the queue is set to 1.

A difference between "marking the identifier of the queue as a to-be-processed state" in step 2412 and "marking the identifier of the queue as the to-be-processed state" in step 2413 lies in that, the flag corresponding to the identifier of the queue in step 2412 is set from 1 to 1, that is, kept unchanged, but the flag corresponding to the identifier of the queue in step 2413 is set from 0 to 1.

Setting of the bitmap flag may be completed by the logic controller shown in FIG. 2A, FIG. 2B.

For example, when it is determined that the cache can store the identifier of the queue and it is determined that the delay request message of the queue "a" needs to be processed preferentially, it is determined whether the identifier "a" of the queue "a" has been stored in the cache. If the identifier "a" has been stored in the cache, the delay request time that has been stored in the cache is updated by using new delay request time of the queue "a", and a bitmap flag corresponding to the identifier "a" of the queue "a" is marked as 1 (a to-be-processed state); and if the identifier "a" has not been stored in the cache, a storage address (for example, an address 10001) is assigned to the queue "a" and is saved, the identifier of the queue "a" is saved in the storage address, and the identifier of the queue "a" is marked as 1 (the to-be-processed state).

Figure 7:
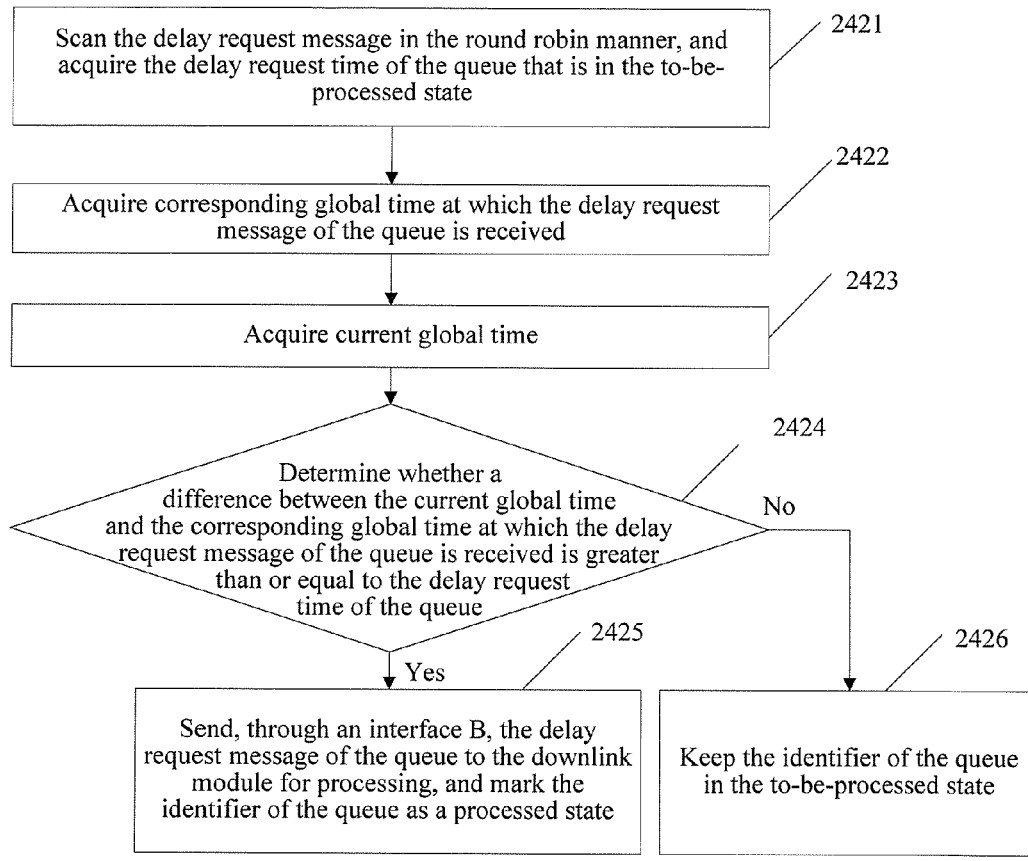
FIG. 7 is a flowchart of scanning work according to the second embodiment of the present invention.

As shown in FIG. 7, step 242 includes:

Step 2421: Scan the delay request message in the round robin manner, and acquire the delay request time of the queue that is in the to-be-processed state.

Step 2422: Acquire corresponding global time at which the delay request message of the queue is received.

Step 2423: Acquire current global time, where the global time is a time point, for example, nine o'clock.

Step 2424: Determine whether a difference between the current global time and the corresponding global time at which the delay request message of the queue is received is greater than or equal to the delay request time of the queue. If yes (indicating that the delay request time of the queue has arrived), perform step 2425; if no (indicating that the delay request time of the queue has not arrived), perform step 2426.

Step 2425: Send, through the interface B, the delay request message of the queue to the downlink module for processing, and mark the identifier of the queue as a processed state (so as to release the storage space in the cache to process a new queue message).

Step 2426: Keep the identifier of the queue in the to-be-processed state.

In a practical application, scanning a delay request message of a queue in a round robin manner means scanning a bitmap. For example, a bitmap is scanned. It is assumed that a queue corresponding to a flag 1 in the bitmap is the queue "a" in the foregoing example, and the delay request time (100 ms) of the queue "a" is acquired. Then, corresponding global time at which the delay request message of the queue "a" is received is acquired and it is assumed that the corresponding global time is 09:20:59.9. Then, current global time is acquired and it is assumed that the current global time is 09:30. A difference between the current global time (09:30) and the corresponding global time (09:20:59.9) at which the delay request message of the queue "a" is received is equal to the delay request time (100 ms) of the queue "a", which indicates that the delay request time of the queue "a" has arrived; therefore, the delay request message of the queue "a" is sent through the interface B to the downlink module for processing, and a flag corresponding to the identifier of the queue "a" is marked as 0 (a processed state). If a queue corresponding to the flag 1 in the bitmap is the queue "b" in the foregoing example, a difference between the current global time and corresponding global time at which the delay request message of the queue "b" is received is less than the delay request time (600 ms) of the queue "b", which indicates that the delay request time of the queue "b" has not arrived, the identifier of the queue "b" is kept as 1 (the to-be-processed state), and a next flag of the bitmap continues to be scanned.

Step 25: Process the delay request message of the queue by using the second unit.

A delay request of a queue in the second unit may be processed according to a delay request processing method in the prior art. A difference from the prior art lies in that, there is a relatively large number of queues in the second unit; and bitmap flags in the second unit may be set to two layers, which are an L1 layer and an L2 layer.

It can be seen from the foregoing that, by using the delay request processing method based on a token bucket in the second embodiment of the present invention, when delay request messages of queues are processed, delay request messages of a part of queues are processed preferentially, so as to increase a speed of processing the delay request messages of the part of queues, thereby increasing a speed of processing delay request messages of all queues involved in delay requesting, and shortening a scanning period. Furthermore, when a message of a queue is being processed in a cache, an error can be reduced by updating stored delay request time by using new delay request time of the queue. After a delay request message of a queue is sent to a downlink module for processing, an identifier of the queue is marked as a processed state, so that storage space can be released in a cache to process a new queue message, thereby saving a resource.

Figure 8:
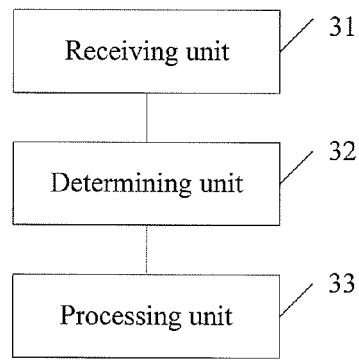
FIG. 8 is a structural diagram of a delay request processing apparatus according to a third embodiment of the present invention.

Accordingly, as shown in FIG. 8, a third embodiment of the present invention provides a delay request processing apparatus based on a token bucket, including: a receiving unit 31, configured to receive a delay request message of a queue corresponding to a token bucket, where the delay request message includes delay request time of the queue; a determining unit 32, configured to determine, according to the delay request time received by the receiving unit 31, whether the delay request message of the queue needs to be processed preferentially; a processing unit 33, configured to process the delay request message in a preferentially processing manner when the determining unit 32 determines that the delay request message of the queue needs to be processed preferentially.

The determining unit 32 is specifically configured to: compare the delay request time of the queue with preset delay time, and if the delay request time of the queue is less than or equal to the preset delay time, determine that the delay request message needs to be processed preferentially; otherwise, determine that the delay request message does not need to be processed preferentially.

Figure 9:
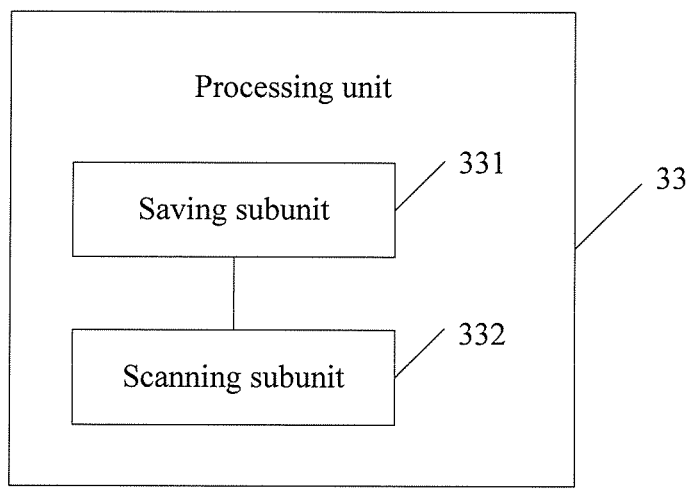
FIG. 9 is a schematic diagram of a processing unit according to the third embodiment of the present invention.

As shown in FIG. 9, the processing unit 33 includes: a saving subunit 331, configured to save the delay request message of the queue when the determining unit 32 determines that the delay request message of the queue needs to be processed preferentially; and a scanning subunit 332, configured to: scan, in the round robin manner, the delay request message, of the queue, saved by the saving subunit 331, and when the delay request time of the queue arrives, send the delay request message of the queue to a downlink module for processing.

The saving subunit 331 is specifically configured to: when an identifier of the queue has been stored, update, by using the delay request time of the queue, stored delay request time corresponding to the identifier of the queue, and mark the identifier of the queue as a to-be-processed state; and when the identifier of the queue has not been stored, store the identifier of the queue, and mark the identifier of the queue as the to-be-processed state. When storing the identifier of the queue, the saving subunit 331 is specifically configured to store the identifier of the queue in a cache. In addition, the determining unit 32 is configured to determine whether the cache can store the identifier of the queue. The saving subunit 331 is specifically configured to store the identifier of the queue in the cache when the determining unit 32 determines that the cache can store the identifier of the queue.

The scanning subunit 332 is specifically configured to: scan the delay request message of the queue in the round robin manner, and acquire the delay request time of the queue that is in the to-be-processed state, where the delay request time of the queue is saved by the saving subunit 331; acquire corresponding global time at which the receiving unit 31 receives the delay request message of the queue; acquire current global time; when a difference between the current global time and the corresponding global time at which the receiving unit 31 receives the delay request message of the queue is greater than or equal to the delay request time of the queue, send the delay request message of the queue to the downlink module for processing, and mark the identifier of the queue as a processed state; and when the difference between the current global time and the corresponding global time at which the receiving unit 31 receives the delay request message of the queue is less than the delay request time of the queue, keep the identifier of the queue in the to-be-processed state.

For a working principle of the apparatus, reference may be made to descriptions in the foregoing method embodiments. Details are not described herein again.

It can be seen from the foregoing that, according to the delay request processing apparatus based on a token bucket in the third embodiment of the present invention, when delay request messages of queues are processed, delay request messages of a part of queues are processed preferentially, so as to increase a speed of processing the delay request messages of the part of queues, thereby increasing a speed of processing delay request messages of all queues involved in delay requesting, and shortening a scanning period. Furthermore, when an identifier of a queue has been stored, an error can be reduced by updating stored delay request time by using new delay request time of the queue. After a delay request message of a queue is processed, an identifier of the queue is marked as a processed state, so that storage space can be released in a cache to process a new queue message, thereby saving a resource.

Figure 10:
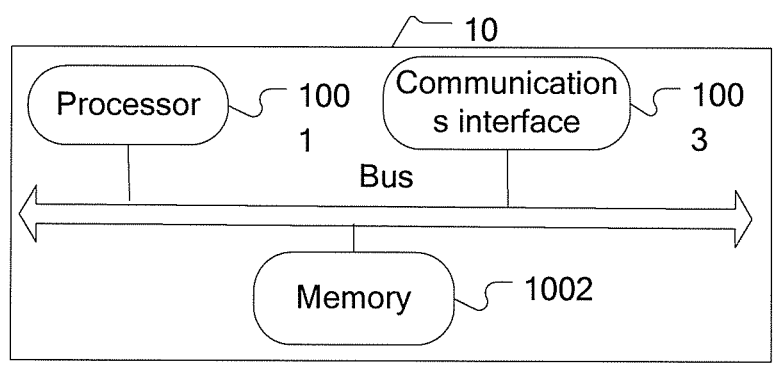
FIG. 10 is a schematic structural diagram of a delay request processing device according to a fourth embodiment of the present invention.

FIG. 10 is a schematic structural diagram of a delay request processing device based on a token bucket according to a fourth embodiment of the present invention. As shown in FIG. 10, the delay request processing device in this embodiment includes: at least one processor 1001, a memory 1002, a communications interface 1003, and a bus. The processor 1001, the memory 1002, and the communications interface 1003 are connected by using the bus and complete mutual communication. The bus may be an industry standard architecture (Industry Standard Architecture, ISA for short) bus, a peripheral component interconnect (PCI for short) bus, an extended industry standard architecture (Extended Industry Standard Architecture, EISA for short) bus, or the like. The bus may be classified into an address bus, a data bus, a control bus, and the like. For ease of indication, only one bold line is used in FIG. 10 to indicate the bus, but this does not mean there is only one bus or one type of bus, where:

the memory 1002 is configured to store executable program code, where the program code includes a computer operation instruction. The memory 1002 may include a high-speed RAM memory, and may also include a non-volatile memory (non-volatile memory), for example, at least one disk memory.

In this embodiment, the processor 1001 runs, by reading the executable program code stored in the memory 1002, a program corresponding to the executable program code, so as to:

receive a delay request message of a queue corresponding to a token bucket, where the delay request message includes delay request time;

determine, according to the delay request time, whether the delay request message is a delay request message that needs to be processed preferentially; and process the delay request message in a preferentially processing manner when it is determined that the delay request message needs to be processed preferentially.

The processor 1001 may be a central processing unit (Central Processing Unit, CPU for short), or an application specific integrated circuit (Application Specific Integrated Circuit, ASIC for short), or one or more integrated circuits that are configured to implement this embodiment of the present invention.

It should be noted that, in addition to the foregoing functions, the foregoing processor 1001 may further be configured to perform other processes in the foregoing method embodiments, and details are not described herein again.

The communications interface 1003 is mainly configured to implement communication between a delay request processing apparatus in this embodiment and another device or apparatus.

A person of ordinary skill in the art may understand that all or a part of the processes of the methods in the foregoing embodiments may be implemented by a computer program instructing relevant hardware. The program may be stored in a computer readable storage medium. When the program runs, the processes of the methods in the foregoing embodiments are performed. The storage medium may include: a magnetic disk, an optical disc, a read-only memory (Read-Only Memory, ROM), or a random access memory (Random Access Memory, RAM).

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A delay request processing method based on a token bucket, comprising:
  receiving a delay request message of a queue corresponding to a token bucket by a processing device including at least a processor, wherein the delay request message comprises delay request time;
  determining by the processor, according to the delay request time, whether the delay request message needs to be processed preferentially; and
  processing the delay request message by the processor in a preferentially processing manner when it is determined that the delay request message needs to be processed preferentially, wherein processing the delay request message comprises:
    determining whether an identifier of the queue that sends the delay request message is stored,
    saving the delay request message, wherein saving the delay request message comprises:
      when the identifier of the queue has been stored, updating, by using the delay request time, stored delay request time corresponding to the identifier of the queue, and marking the identifier of the queue as a to-be-processed state; and
      when the identifier of the queue has not been stored, storing the identifier of the queue, and marking the identifier of the queue as the to-be-processed state, and
    scanning the delay request message in a round robin manner, and when the delay request time arrives, sending the delay request message to a downlink module for processing, comprising:
      scanning the delay request message in the round robin manner, and acquiring the delay request time of the queue that is in the to-be-processed state;
      acquiring corresponding global time at which the delay request message is received;
      acquiring current global time;
      when a difference between the current global time and the corresponding global time at which the delay request message is received is greater than or equal to the delay request time, sending the delay request message to the downlink module for processing, and marking the identifier of the queue as a processed state; and
      when the difference between the current global time and the corresponding global time at which the delay request message is received is less than the delay request time, keeping the identifier of the queue in the to-be-processed state.

2. The delay request processing method based on a token bucket according to claim 1, wherein the storing the identifier of the queue comprises:
  storing the identifier of the queue in a cache.

3. The delay request processing method based on a token bucket according to claim 2, wherein before storing the identifier of the queue in a cache, the method further comprises:
  determining whether the cache can store the identifier of the queue; and
  the storing the identifier of the queue in a cache specifically comprises: storing the identifier of the queue in the cache when it is determined that the cache can store the identifier of the queue.

4. The delay request processing method based on a token bucket according to claim 1, wherein determining, according to the delay request time, whether the delay request message needs to be processed preferentially comprises:
  comparing the delay request time with preset delay time; and
  if the delay request time is less than or equal to the preset delay time, determining that the delay request message needs to be processed preferentially; if the delay request time is greater than the preset delay time determining that the delay request message does not need to be processed preferentially.

5. A delay request processing apparatus based on a token bucket, the apparatus comprising:
  a memory storing executable program code and
  a hardware processor configured to execute the program code to:
    receive a delay request message of a queue corresponding to a token bucket, wherein the delay request message comprises delay request time,
    determine, according to the delay request time, whether the delay request message needs to be processed preferentially,
    process the delay request message in a preferentially processing manner when the delay request message needs to be processed preferentially,
    save the delay request message when the delay request message needs to be processed preferentially,
    when the identifier of the queue has not been stored, store the identifier of the queue, and mark the identifier of the queue as a to-be-processed state,
    when an identifier of the queue has been stored, update, by using the delay request time, stored delay request time corresponding to the identifier of the queue, and mark the identifier of the queue as a to-be-processed state,
    scan the delay request message in the round robin manner, and acquire the delay request time of the queue that is in the to-be-processed state, wherein the delay request time of the queue is saved,
    acquire corresponding global time at which the delay request message is received,
    acquire current global time, when a difference between the current global time and the corresponding global time at which the delay request message is received is greater than or equal to the delay request time, send the delay request message to a downlink module for processing, and mark the identifier of the queue as a processed state, and when the difference between the current global time and the corresponding global time at which the delay request message is received is less than the delay request time, keep the identifier of the queue in the to-be-processed state.

6. The delay request processing apparatus based on a token bucket according to claim 5, wherein when storing the identifier of the queue, the processor also stores the identifier of the queue in a cache.

7. The delay request processing apparatus based on a token bucket according to claim 6, wherein the processor is further configured to execute the program code to:
 determine whether the cache can store the identifier of the queue; and
 store the identifier of the queue in the cache when the cache can store the identifier of the queue.

8. The delay request processing apparatus based on a token bucket according to claim 5, wherein the processor is further configured to execute the program code to:
 compare the delay request time with preset delay time, and when the delay request time is less than or equal to the preset delay time, determine that the delay request message needs to be processed preferentially; otherwise, determine that the delay request message does not need to be processed preferentially.

\* \* \* \* \*